United States Patent
Ferguson et al.

(10) Patent No.: US 10,662,765 B2
(45) Date of Patent: May 26, 2020

(54) WELLSITE EMISSIONS MONITORING AND CONTROL

(71) Applicant: SCHLUMBERGER TECHNOLOGY CORPORATION, Sugar Land, TX (US)

(72) Inventors: Du'Bois Joseph Ferguson, Houston, TX (US); Liang Du, Sugar Land, TX (US); Garud Bindiganavale Sridhar, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 247 days.

(21) Appl. No.: 15/761,267

(22) PCT Filed: May 9, 2016

(86) PCT No.: PCT/US2016/050326
§ 371 (c)(1),
(2) Date: Mar. 19, 2018

(87) PCT Pub. No.: WO2017/048543
PCT Pub. Date: Mar. 23, 2017

(65) Prior Publication Data
US 2018/0266241 A1    Sep. 20, 2018

Related U.S. Application Data

(60) Provisional application No. 62/220,450, filed on Sep. 18, 2015.

(51) Int. Cl.
*E21B 47/12* (2012.01)
*B64C 39/02* (2006.01)
(Continued)

(52) U.S. Cl.
CPC .......... *E21B 47/122* (2013.01); *B64C 39/024* (2013.01); *E21B 43/26* (2013.01);
(Continued)

(58) Field of Classification Search
CPC ...... E21B 47/122; E21B 44/00; E21B 44/005; E21B 44/02; E21B 7/022; E21B 43/26;
(Continued)

(56) References Cited

U.S. PATENT DOCUMENTS 5,430,293 A * 7/1995 Sato ........................ G01M 3/38
250/330
5,539,638 A * 7/1996 Keeler ................ F02D 41/1401
701/32.9

(Continued)

FOREIGN PATENT DOCUMENTS

KR    10-2008-0022649 A    3/2008
WO       2015113962 A1     8/2015

OTHER PUBLICATIONS

International Search Report and Written Opinion issued in International Patent Appl. No. PCT/US2016/050326 dated Nov. 28, 2016; 18 pages.

*Primary Examiner* — Blake E Michener

(57) ABSTRACT

Methods and apparatus for monitoring and controlling wellsite emissions. A mobile emissions monitoring device is operated in airspace above a wellsite to generate and transmit a monitor signal related to emissions in the airspace. The emissions may be associated with wellsite equipment at the wellsite. A processing system in receipt of the monitor signal operates to cause a change in an operational parameter of the wellsite equipment based on information conveyed by the monitor signal.

44 Claims, 5 Drawing Sheets

(51) Int. Cl.
*G06Q 10/06* (2012.01)
*E21B 43/26* (2006.01)
*E21B 44/00* (2006.01)
*H04N 5/232* (2006.01)
*F02D 41/02* (2006.01)

(52) U.S. Cl.
CPC ............ *E21B 44/00* (2013.01); *F02D 41/021* (2013.01); *G06Q 10/063* (2013.01); *H04N 5/232* (2013.01); *B64C 2201/12* (2013.01); *B64C 2201/127* (2013.01); *B64C 2201/145* (2013.01); *B64C 2201/146* (2013.01); *F02D 2250/00* (2013.01); *Y02P 90/845* (2015.11)

(58) Field of Classification Search
CPC .... Y02P 90/845; G06Q 10/063; H04N 5/232; B64C 39/024; B64C 2201/145; B64C 2201/146; B64C 2201/12
See application file for complete search history.

(56) References Cited

U.S. PATENT DOCUMENTS

| | | | |
|---|---|---|---|
| 6,662,795 B2* | 12/2003 | Baldwin | F02D 41/1448 123/676 |
| 6,975,975 B2* | 12/2005 | Fasca | G05B 17/02 110/345 |
| 7,073,748 B2* | 7/2006 | Maurer | B64C 39/024 209/143 |
| 7,096,749 B2 | 8/2006 | Schimmoller et al. | |
| 7,998,731 B2* | 8/2011 | Daitch | G01N 1/2273 435/287.4 |
| 8,197,752 B2* | 6/2012 | Nojima | G06Q 50/06 422/62 |
| 8,820,672 B2* | 9/2014 | Erben | B64C 39/024 244/1 R |
| 9,890,677 B2* | 2/2018 | Adams | F01N 3/106 |
| 10,065,739 B2* | 9/2018 | Duesterhoft | B64D 1/00 |
| 10,086,938 B2* | 10/2018 | Duesterhoft | B64D 1/02 |
| 10,094,773 B2* | 10/2018 | Myshak | G01J 3/0208 |
| 10,113,956 B1* | 10/2018 | Li | G01N 21/3504 |
| 10,139,837 B2* | 11/2018 | Qin | B64C 39/024 |
| 10,175,151 B2* | 1/2019 | Avakov | G01N 1/2273 |
| 10,179,655 B2* | 1/2019 | Gurumoorthi | B64D 45/00 |
| 10,192,182 B2* | 1/2019 | Whipple | G06Q 50/06 |
| 10,322,803 B2* | 6/2019 | Flood | G08G 5/0069 |
| 10,330,571 B2* | 6/2019 | Adams | G01N 1/2273 |
| 10,408,028 B2* | 9/2019 | Stephenson | E21B 41/00 |
| 2004/0263852 A1* | 12/2004 | Degtiarev | G01M 3/38 356/437 |
| 2005/0134859 A1* | 6/2005 | Kalayeh | G01N 21/3504 356/437 |
| 2006/0011776 A1* | 1/2006 | Maurer | B64C 39/024 244/1 R |
| 2006/0123928 A1 | 6/2006 | Schimmoller et al. | |
| 2007/0179640 A1* | 8/2007 | Moughler | E02F 9/2045 700/36 |
| 2010/0250022 A1 | 9/2010 | Hines et al. | |
| 2011/0144828 A1 | 6/2011 | Chengalva | |
| 2012/0054270 A1* | 3/2012 | Foreman | G06Q 10/10 709/203 |
| 2012/0092649 A1* | 4/2012 | Wong | G01W 1/00 356/72 |
| 2012/0166022 A1 | 6/2012 | Kwon et al. | |
| 2012/0166096 A1* | 6/2012 | Stephenson | G06Q 10/06 702/23 |
| 2013/0176570 A1* | 7/2013 | Beck | G01N 21/314 356/433 |
| 2013/0208262 A1* | 8/2013 | Andreussi | G01M 3/38 356/72 |
| 2013/0292512 A1 | 11/2013 | Erben et al. | |
| 2015/0234387 A1 | 8/2015 | Mullan et al. | |
| 2015/0321758 A1* | 11/2015 | Sarna, II | G05D 1/0011 244/63 |
| 2015/0323449 A1* | 11/2015 | Jones | G01N 21/3103 356/437 |
| 2016/0025603 A1* | 1/2016 | Kindt | G01N 33/56983 506/9 |
| 2016/0222771 A1* | 8/2016 | Stephenson | E21B 43/26 |
| 2016/0328943 A1* | 11/2016 | Cenac | E21B 43/26 |
| 2016/0363932 A1* | 12/2016 | Moriarity | B64C 39/024 |
| 2016/0370263 A1* | 12/2016 | Duesterhoft | B64C 39/024 |
| 2017/0003684 A1* | 1/2017 | Knudsen | G01N 33/0042 |
| 2017/0161972 A1* | 6/2017 | Moloney | G07C 5/0841 |
| 2017/0226842 A1* | 8/2017 | Omont | E21B 33/13 |
| 2018/0074519 A1* | 3/2018 | Qin | B64C 39/024 |
| 2018/0136093 A1* | 5/2018 | Avakov | G01N 1/2273 |
| 2019/0003918 A1* | 1/2019 | Li | G01N 33/0027 |
| 2019/0128711 A1* | 5/2019 | Connor | H04W 4/40 |
| 2019/0128862 A1* | 5/2019 | Willett | G01N 33/0032 |
| 2019/0204189 A1* | 7/2019 | Mohr, Jr. | G01N 21/00 |
| 2019/0234868 A1* | 8/2019 | Tanomura | B64C 39/024 |

* cited by examiner

WELLSITE EMISSIONS MONITORING AND CONTROL

CROSS-REFERENCE TO RELATED APPLICATIONS

This application claims priority to and the benefit of U.S. Provisional Application No. 62/220,450, titled "Airborne Particulate Sampling Utilizing Unmanned Aerial Vehicle Technology and Remote Sensing Instrumentation," filed Sep. 18, 2015, the entire disclosure of which is hereby incorporated herein by reference.

BACKGROUND OF THE DISCLOSURE

Advanced petroleum and natural gas production technologies are increasingly used to help meet the demand for energy in both the United States and globally. As conventional resources become scarcer, research and innovation by oil and gas industry has resulted in techniques for tapping unconventional resources, including hydrocarbons trapped in shale formations found in a number of locations throughout the United States. One technology for accessing such resources is hydraulic fracturing, which has transformed natural gas production over the past several years and is also being applied to increase petroleum production. However, new energy supply technologies also bring new environmental management challenges. Among the issues of concern are air pollution emissions from fracturing operations and whether the emissions can potentially impact air quality at wellsites and in surrounding communities. Wellsite emissions may include airborne particulate material released into the airspace surrounding the wellsite during fracturing and other wellsite operations. Wellsite emissions may also include various gasses generated by the wellsite equipment, as well as various gasses released from the Earth's crust into the airspace surrounding the wellsite.

Methods to measure airborne particulate material levels to assess particulate mass flux and dispersion may be implemented during short duration high intensity release of the particulate material during hydraulic fracturing and other wellsite operations. However, the methodologies currently available are intended primarily for large stationary sources.

Pollution emission models to estimate emissions at oil and gas wellsites may be generated based on wellsite activity levels by taking into account emission factors like operating hours, engine ratings, equipment load factors, and other emission factors. The oil and gas industry has been using United States Environmental Protection Agency (EPA) methods to estimate total emissions at oil and gas wellsites. For example, determination of mass of the airborne particulate material may be performed in accordance with the guidance EPA/625/R-96/010a, titled Compendium of Methods for the Determination of Inorganic Compounds in Ambient Air, Compendium Method 10-2.1. The method includes sampling of a large volume of atmosphere, ranging between 57,000 cubic feet ($ft^3$) and 86,000 $ft^3$, with a high-volume blower, typically at a rate ranging between 40 cubic feet per minute ($ft^3/min$) and 60 $ft^3/min$. The high volume sampler may be a compact unit comprising a protective housing, an electric motor driven high-speed, high-volume blower, a filter holder capable of supporting a 203 millimeter (mm) by 254 mm (8 inch by 10 inch) filter, and a flow-controller for controlling the air-flow rate through the sampler.

Another method to obtain representative particulate concentrations during the materials handling operations includes EPA Method 204, titled Criteria and Verification of a Permanent or Temporary Total Enclosure. However, implementing an enclosure over an entire wellsite to capture the particulate material and other emissions generated by the wellsite is impractical and/or impossible.

Tapered element oscillating microbalance (TEOM) samplers may also be utilized by air pollution emissions regulatory agencies and air quality researchers as part of an automated particulate material monitoring system. However, research has shown that TEOM samplers may not report accurate particulate material concentrations due to the operating characteristics of the automated system. TEOM samplers are also too sensitive for operation in the oil and gas environment and, thus, are not a viable alternative for the routine collection of particulate material data at wellsites.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes an unmanned aerial vehicle (UAV) and a processing system. The UAV is operable to fly through airspace above a wellsite and transmit a monitor signal related to emissions in the airspace. The emissions are associated with wellsite equipment at the wellsite. The processing system includes a processor and a memory including computer program code, and is operable to cause a change in an operational parameter of the wellsite equipment based on the monitor signal received from the UAV.

The present disclosure also introduces a method that includes operating a mobile emissions monitoring device in airspace above a wellsite to generate and transmit a monitor signal related to emissions in the airspace. The emissions are associated with wellsite equipment at the wellsite. The method also includes operating a processing system in receipt of the monitor signal to cause a change in an operational parameter of the wellsite equipment based on information conveyed by the monitor signal. The processing system includes a processor and a memory including computer program code.

The present disclosure also introduces a method that includes flying a UAV through an airspace above a wellsite, operating wellsite equipment components at the wellsite, and operating a sensor carried by the UAV to generate a wireless monitor signal related to emissions in the airspace. The operation of one or more of the wellsite equipment components is adjusted based on information conveyed in the monitor signal.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 is a schematic view of at least a portion of an example implementation of apparatus according to one or more aspects of the present disclosure.

DETAILED DESCRIPTION

Figure 1:
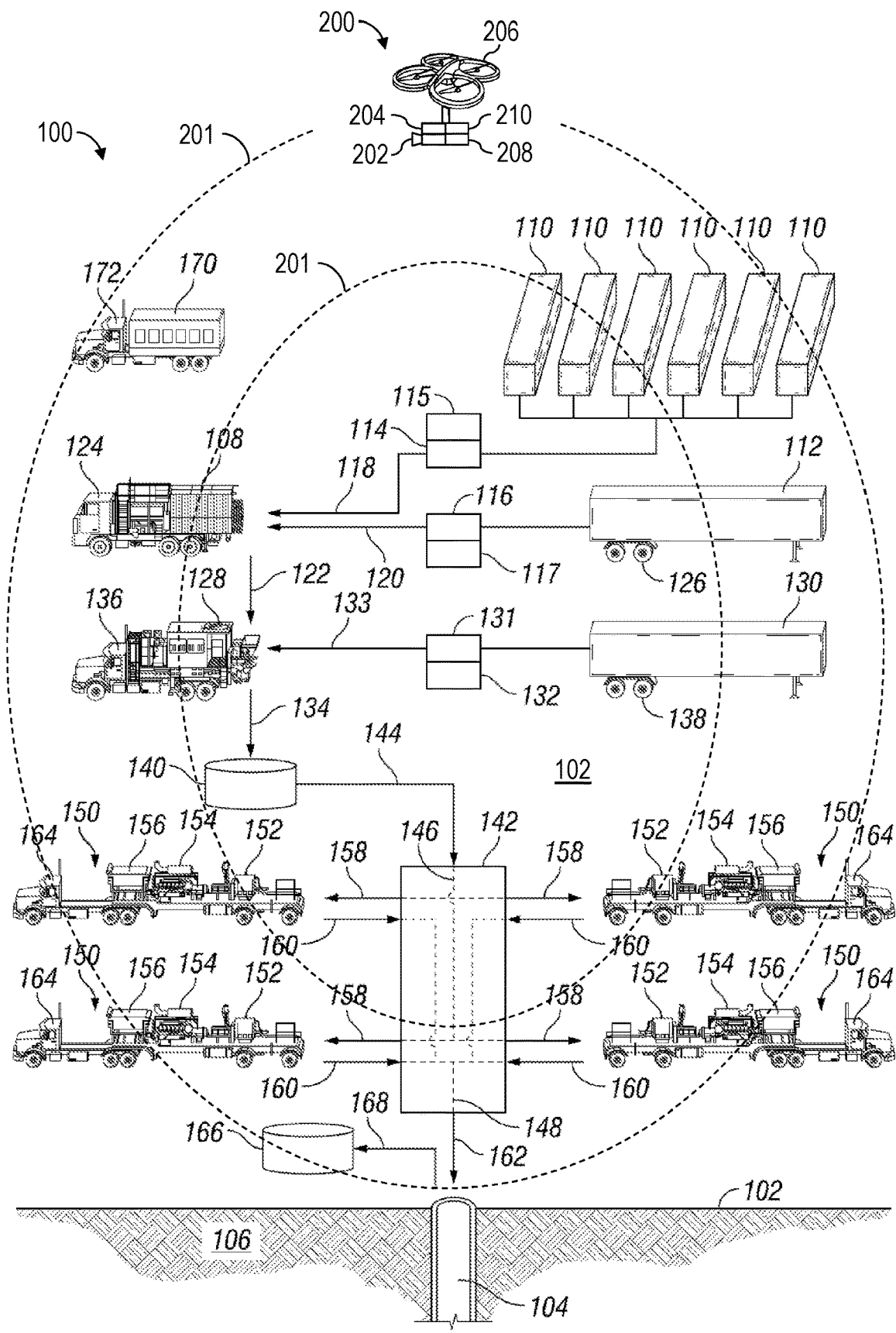

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

As introduced herein, an emissions monitoring and control system may be operable to monitor levels of particulate material and gas emissions released into airspace around and/or above a wellsite. In some examples, the emissions monitoring and control system may utilize a particulate material sensor to measure the presence and/or level of particulate material released into the airspace above the wellsite. The particulate material sensor may be an opacity sensor or a visible image sensor operable to determine opacity of airborne particulate emissions, which may then be utilized to determine concentration of the airborne particulate emissions. The emissions monitoring and control system may also utilize one or more gas sensors operable to measure the presence and/or concentration of gasses released into the airspace above the wellsite. If the determined level or concentrations of the particulate material and/or gasses in the airspace around the wellsite are above a predetermined target threshold or range, the emissions monitoring and control system may cause a change in an operational parameter of one or more pieces of wellsite equipment or otherwise adjust the operation of the wellsite equipment to decrease the rate of particulate material and/or gas emissions.

The particulate material and gas sensors may be carried through the airspace around and/or above the wellsite by an unmanned aerial vehicle (UAV) while the sensors are operating to measure the presence, levels, and/or concentrations of particulate material and/or gasses in the airspace surrounding the wellsite. The use of a UAV permits emission monitoring and/or control without exposing personnel to hazardous conditions that may exist at the wellsite. The sensors may be employed to simultaneously monitor for inorganic compounds, organic compounds, and radioactive compounds.

Some examples described herein are in the context of a hydraulic fracturing or cementing well site in the oil and gas industry. An emissions monitoring and control system within the scope of the present disclosure may be utilized with various types of physical equipment units, such as equipment units at an oilfield wellsite or at other worksites, such as, without limitation, a manufacturing facility and a construction site. In an oilfield environment, the wellsite equipment may be located at a wellsite that can be either onshore or offshore. Other implementations can be in the context of other worksites and/or outside of the oil and gas industry.

FIG. 1 is a schematic view of at least a portion of an example implementation of an oil and gas wellsite system 100 that provides an example environment for an emissions monitoring and control system ("monitoring system") according to one or more aspects of the present disclosure. The figure depicts a wellsite surface 102 adjacent to a wellbore 104 and a partial sectional view of a subterranean formation 106 penetrated by the wellbore 104 below the wellsite surface 102. The wellsite system 100 may be an additive system, such as a hydraulic fracturing system, a cementing system, or another additive system operable to transfer an additive or other material from a source location to a destination location for blending or mixing with another additive or material and eventual injection into the wellbore 104.

The wellsite system 100 may comprise a first mixer 108 connected with one or more first containers 110 and a second container 112. The second container 112 may contain a first additive and the first containers 110 may contain water or another liquid comprising water. When the wellsite system 100 is operable as a fracturing system, the first additive may be or comprise a compositional component of a fracturing fluid, such as a hydratable material or gelling agent, including guar, a polymer, a synthetic polymer, a galactomannan, a polysaccharide, a cellulose, and/or a clay, among other examples, and the liquid may be or comprise an aqueous fluid, which may comprise water or an aqueous solution comprising water, among other examples. When the wellsite system 100 is operable as a cementing system, the first additive may be or comprise a compositional component of a cement slurry, such as cement powder.

The liquid may be transferred from the first containers 110 to the first mixer 108 by a first material transfer device 114, such as may be driven by a first prime mover 115. The first material transfer device 114 may be or comprise a pump, while the first prime mover 115 may be or comprise an electric motor, an engine, or another rotary actuator. The first additive may be transferred from the second container 112 to the first mixer 108 by a second material transfer device 116, such as may be driven by a second prime mover 117. The second material transfer device 116 may be or comprise a conveyer, a transfer belt, a bucket elevator, or a feeding screw, while the second prime mover 117 may be or comprise an electric motor, an engine, or another rotary actuator. The first mixer 108 may be operable to receive the first additive and the liquid via two or more conduits 118, 120, and mix or otherwise combine the first additive and the liquid to form a base fluid. The first mixer 108 may then discharge the base fluid via one or more conduits 122.

The first mixer 108 and the second container 112 may each be disposed on corresponding trucks, trailers, and/or other mobile carriers 124, 126, respectively, to permit their transportation to the wellsite surface 102. However, the first mixer 108 and/or second container 112 may be skidded or otherwise stationary, and/or may be temporarily or permanently installed at the wellsite surface 102.

The wellsite system 100 may further comprise a second mixer 128 fluidly connected with the first mixer 108 and a third container 130. The third container 130 may contain a second additive that may be substantially different than the first additive. When the wellsite system 100 is operable as the hydraulic fracturing system, the second additive may be or comprise a compositional component of the fracturing fluid, such as a proppant material, including sand, sand-like particles, silica, quartz, and/or propping agents, as well as fiber, such as fiberglass, phenol formaldehydes, polyesters, polylactic acid, cedar bark, shredded cane stalks, and mineral fiber. Whether the wellsite system 100 is operable as the hydraulic fracturing or cementing system, the second additive may also include dry oilfield chemical additives, such as friction reducers, accelerators, retarders, fluid-loss additives, dispersants, extenders, weighting agents, lost circulation additives and/or other chemical compositional components operable to modify the characteristics of the fracturing fluid and cement slurry. The second additives may be provided in a solid or dry form, such as powder or particulate material, or a liquid form.

The second additive may be transferred from the third container 130 to the second mixer 128 by a third material transfer device 131 driven by a third prime mover 132. The third material transfer device 131 may be or comprise a pump when the second additive is a liquid, or the third material transfer device 131 may be or comprise a conveyer, a transfer belt, a bucket elevator, or a feeding screw when the second additive is a solid material. The third prime mover 132 may be or comprise an electric motor, an engine, or another rotary actuator. The second mixer 128 may be operable to receive the base fluid from the first mixer 108 via one or more conduits 122, and a second additive from the third container 130 via one or more conduits 133, and mix or otherwise combine the base fluid and the second additive to form a mixture. The mixture may comprise the fracturing fluid when the wellsite system 100 is operable as a fracturing system, or the mixture may comprise the cement slurry when the wellsite system 100 is operable as a cementing system. The second mixer 128 may then discharge the mixture via one or more conduits 134.

The second mixer 128 and the third container 130 may each be disposed on corresponding trucks, trailers, and/or other mobile carriers 136, 138, respectively, to permit their transportation to the wellsite surface 102. However, the second mixer 128 and/or third container 130 may be skidded or otherwise stationary, and/or may be temporarily or permanently installed at the wellsite surface 102.

The mixture may be communicated from the second mixer 128 to a fourth container 140, which may be or comprise a mixing, displacement, or storage tank for the mixture prior to being injected into the wellbore 104. The mixture may be communicated from the fourth container 140 to a common manifold 142 via the one or more conduits 144. The common manifold 142 may comprise a combination of valves and/or diverters, as well as a suction line 146 and a discharge line 148, such as may be collectively operable to direct flow of the mixture in a selected or predetermined manner. The common manifold 142, which may be known in the art as a missile or a missile trailer, may distribute the mixture to a pump fleet. The pump fleet may comprise multiple pumping units 150 each comprising a pump 152, a prime mover 154, and a heat exchanger 156. Each pumping unit 150 may receive the mixture from the suction line 146 of the common manifold 142, via one or more conduits 158, and discharge the mixture under pressure to the discharge line 148 of the common manifold 142, via one or more conduits 160.

The pumping units 150 may each be mounted on corresponding trucks, trailers, and/or other mobile carriers 164, such as may permit their transportation to the wellsite surface 102. However, the pumping units 150 may be skidded or otherwise stationary, and/or may be temporarily or permanently installed at the wellsite surface 102.

The mixture may then be discharged from the common manifold 142 into the wellbore 104 via one or more conduits 162, such as may include various valves, conduits, and/or other hydraulic circuitry fluidly connected between the common manifold 142 and the wellbore 104. During operations, the mixture and/or wellbore fluid may be ejected from the wellbore 104 and communicated to a fifth container 166 via one or more conduits 168. Although the wellsite system 100 is shown comprising a fourth container 140, it is to be understood that the fourth container 140 may not be included as part of the wellsite system 100, such that the mixture may be communicated from the second mixer 128 directly to the common manifold 142. The wellsite system 100 may also omit the common manifold 142, and the conduits 160 may be fluidly connected to the wellbore 104 via a wellhead 105 (shown in FIG. 4) and/or other means.

The wellsite system 100 may also comprise a control center 170, which may be operable to monitor and control at least a portion of the wellsite system 100 during wellsite operations. Signals may be communicated between the control center 170 and other components of the wellsite system 100 via a communication system including wired connections, wireless communication, or a combination of these. The control center 170 may be operable to monitor temperature, viscosity, density, and composition of the liquid contained in the first containers 110, the first additive, the second additive, and/or the mixture. The control center 170 may also be operable to monitor and/or control the production rate of the mixture, such as by increasing or decreasing the flow of the liquid from the first containers 110, the first additive from the second container 112, the base fluid from the first mixer 108, the second additive from the third container 130, and/or the mixture from the second mixer 128. Accordingly, the control center 170 may be operable to monitor and/or control operational parameters associated with the containers 110, 112, 130, 140, 166, the first and second mixers 108, 128, the material transfer devices 114, 116, 131, the pumping units 150, as well as other pieces of wellsite equipment and/or devices utilized in association with the wellsite system 100.

The control center 170 may be disposed on a corresponding truck, trailer, cabin, and/or other mobile carrier 172, such as may permit its transportation to the wellsite surface 102. However, the control center 170 may be skidded or otherwise stationary, and/or may be temporarily or permanently installed at the wellsite surface 102.

FIG. 1 depicts the wellsite system 100 as being operable to transfer additives and produce mixtures that may be pressurized and injected into the wellbore 104 during hydraulic fracturing or cementing operations. However, it is to be understood that the wellsite system 100 may be operable to transfer other additives and produce other mixtures that may be pressurized and injected into the wellbore

104 during other oilfield operations, such as drilling, acidizing, chemical injecting, and/or water jet cutting operations, among other examples.

During various wellsite operations, the wellsite system 100 may generate or release emissions into the airspace around the wellsite system 100 above the wellsite surface 102. Such emissions may include airborne particulate material, which includes dust, dirt, soot, smoke, and liquid droplets emitted into the air and small enough to be suspended in the atmosphere. The airborne particulate material may be a complex mixture of organic and inorganic substances and may be characterized by their physical attributes, which influence their transport and deposition, and their chemical composition, which influences their effect on health. The physical attributes of airborne particulate material include mass concentration and size distribution. Ambient levels of mass concentration may be measured in micrograms per cubic meter (μg/m3) and size attributes may be measured in aerodynamic diameter. Particulate material exceeding 10 microns (μm) (PM10) in aerodynamic diameter is generally defined as coarse particles, while particles smaller than 2.5 microns (PM2.5) are called fine particles. The particulate material may be or comprise compositional components of subterranean formation treatment fluids, such as the fracturing fluid and cement slurry described above.

National Institute for Occupational Safety and Health (NIOSH) has identified several primary sources of airborne particulate exposure during hydraulic fracturing operations, including: dust ejected from thief hatches (i.e., access ports) on top of the sand movers during refilling operations while the sand movers are running (i.e., hot loading); dust ejected and pulsed through open side fill ports on the sand movers during refilling operations; dust generated by on-site vehicle traffic; dust released from the transfer belt under the sand movers; dust created as sand drops into, or is agitated in, the blender hopper and on transfer belts; dust released from operations of transfer belts between the sand mover and the blender; and dust released from the top of the end of the sand transfer belt (i.e., dragon's tail) on sand movers. Accordingly, the particulate material emissions released during fracturing operations may include particles of compositional components of the fracturing fluid mixed at the wellsite system 100, including, but not limited to guar dust, fiber dust, chemical additive dust, silica dust, and sand dust. Likewise, the particulate material emissions released during cementing operations may include particles of compositional components of the cement slurry mixed at the wellsite system 100, including, but not limited to cement dust and airborne particles of various cement slurry modifiers. NIOSH has identified exposure to certain airborne particulate materials, such as silica, as a health hazard to workers conducting some hydraulic fracturing operations. NIOSH's recent field studies show that workers may be exposed to dust with high levels of respirable crystalline silica during hydraulic fracturing.

Furthermore, the emissions released during wellsite operations may include gasses released by various pieces of hydrocarbon burning or combusting wellsite equipment, including, but not limited to, the trucks 124, 136, 164, 172 and pump engines 154. Emissions released by the hydrocarbon burning equipment at the wellsite 102 may include carbon monoxide (CO), carbon dioxide ($C_2O$), nitrous oxide ($N_2O$), volatile organic compounds (VOCs), and other greenhouse gasses. The emissions released during wellsite operations may also include gasses released from the subterranean formation via the wellbore 104 during the wellsite operations. Such emissions may include methane ($CH_4$), hydrogen sulfide ($H_2S$), mog-forming VOCs, and other greenhouse gasses released from the wellbore 104.

The EPA has updated the New Source Performance Standards (NSPS) for the oil and gas industry to add requirements that the industry reduce emissions of greenhouse gases and to cover additional equipment and activities in the oil and gas production chain. Oil and gas wellbores emit methane and nonmethane hydrocarbons (NMHC) into the atmosphere. Methane is 25 times more powerful than carbon dioxide at trapping heat in the atmosphere and nitrous oxide is approximately 300 times more powerful than carbon dioxide at trapping heat in the atmosphere. In response, EPA is developing regulations to reduce methane emissions from existing oil and gas wells and has issued a draft Information Collection Request (ICR) to request oil and natural gas companies to provide extensive information to develop regulations to reduce methane emissions from the existing oil and gas wells. In addition, the agency announced plans to issue an ICR to seek information on innovative strategies that can accurately and cost-effectively locate, measure, and mitigate methane emissions.

As further shown in FIG. 1, one or more mobile or aerial emissions sensing devices 200 may be provided to fly through the airspace around and/or above the wellsite system 100 and to monitor levels or concentrations of emissions released into the airspace by the wellsite system 100. The aerial emissions sensing device 200 may be operable to fly along one or more predetermined flight paths 201 through the airspace around and/or above the wellsite system 100 as it monitors the levels and/or concentrations of airborne emissions. Although the flight paths 201 are shown comprising a generally circular or elliptical geometries, it is to be understood that the flight paths 201 may comprise other geometries, including triangular, star, and zigzag geometries, among other examples.

The aerial emissions sensing device 200 may comprise one or more sensors carried by an unmanned aerial vehicle (UAV) 206 (e.g., a drone) and operable to monitor the levels or concentrations of the emissions released into the airspace around the wellsite system 100 above the wellsite surface 102. In other example implementations, the emission sensors 202, 204 may be mounted on a fixed structure, such as a tower, derrick, pole, building, natural feature (e.g., a cliff or hill), or the like.

The aerial emissions sensing device 200 may comprise a dust or particulate material sensor ("particle sensor") 202 operable to generate a sensor signal or information indicative of airborne particulate material. The particle sensor 202 may be operable to detect the presence, level, and/or concentration of the particulate material, such as the cement dust, guar dust, fiber dust, chemical additive dust, silica dust, and sand dust, among other examples. The particle sensor 202 may be or comprise an opacity sensor 202 or otherwise measure opacity of the airborne particulate material (i.e., dust plume). Thus, the emissions monitoring system may include a procedure to convert the opacity measurements into particulate material concentrations and/or particle size to determine actual particulate material concentration or emission flux in the airspace above the wellsite system 100. The relationship between opacity and particulate concentration may be established by implementation of a sampling and analysis plan that compares the detected opacity with opacity obtained from a commercially available nephelometer (i.e., light scattering photometer) particulate sensor and existing gravimetric methods resulting in a correlation between the measurements. The relationship established between observed particulate material opacity and measured concentration may be utilized to provide operational control parameters that may subsequently control one or more pieces of solid handling equipment or other wellsite equipment to minimize or control emission generation.

The opacity sensor 202 may generate an opacity signal or information, which may be processed, analyzed, or otherwise utilized to determine particulate material concentrations, which, in turn, may be compared to predetermined particulate material concentrations to ascertain whether particulate material emissions at the wellsite system 100 are above or within a predetermined target threshold or range. Accordingly, determination of opacity and/or particulate material concentration may utilize hardware, software, and the digital imagery captured by the opacity sensor 202. The opacity sensor 202 may be, for example, Thermo Scientific Data RAM 4 Particulate Monitor operable to determine concentrations of total suspended particulates, including PM10 and PM2.5 particles. In an example implementation, the opacity sensor 202 may be an image-capturing device, such as a still photo camera or a video camera, operable to capture digital optical or visible images or video of the airborne particles in the airspace. The image or video may then be transmitted, processed, and/or otherwise utilized to determine the level and/or concentration of the particulate material and whether the particulate material emissions at the wellsite system 100 are above or within the predetermined target threshold or range. The image-capturing device may be or include, for example, a GoPro Hero series video camera or another video camera having similar or higher performance specifications. The opacity analysis of the captured images may be supported by Virtual Tech, LLC, software and utilize automated EPA Method 9 and/or Digital Camera Opacity Techniques (DCOT) as specified by EPA Alternative Method 082 and ASTM D7520 to correlate the observed opacity with particulate material concentration.

The aerial emissions sensing device 200 may comprise a gas sensor 204 operable to generate a gas signal or information, which may be processed, analyzed, or otherwise utilized to determine presence, level, and/or concentrations of gasses released into the airspace around the wellsite system 100. The determined concentrations may be compared to predetermined target concentration threshold or range to ascertain whether the gas emissions at the wellsite system 100 are above or within the predetermined target threshold or range. The gas sensor 204 may be operable to detect gasses, such as methane, carbon monoxide, carbon dioxide, hydrogen sulfide, nitrous oxide, VOCs, and other greenhouse gasses among other examples. The gas sensor 204 may be or include, for example, a Vaisala GMM-220 sensor, an Eosense gas sensor, a Salamander Gas Clam series sensor, a Li-Cor Gas Flux series sensor, or other gas sensors operable to detect the gasses described above.

The aerial emissions sensing device 200 may further comprise a wireless transceiver 208 operable to communicate with the wellsite equipment operable to receive and/or transmit wireless communications. For example, the wireless transceiver 208 may facilitate communication with the control center 170, the mixers 108, 128, the material transfer devices 114, 116, 131, and the pumping units 150. In an example implementation, the wireless transceiver 208 may comprise a radio communication device, such as a Wi-Fi transceiver. The aerial emissions sensing device 200 may also comprise a global positioning system (GPS) signal receiver 212 (shown in FIG. 5) operable to receive or acquire location information from a GPS satellite. The aerial emissions sensing device 200 may utilize such GPS location information and/or comprise other geographic information system (GIS) capabilities to conduct flights along one or more predetermined flight paths 201 through the airspace above the wellsite system 100. The aerial emissions sensing device 200 may also comprise a controller 210 in communication with the particle sensor 202, the gas sensor 204, the UAV 206, the wireless transceiver 208, and the GPS signal receiver 212. As further described below, the controller 210 may be operable to receive and process signals or information from the particle sensor 202, the gas sensor 204, the wireless transceiver 208, and the GPS signal receiver 212 and execute machine-readable instructions based on the received information to implement at least a portion of one or more methods, processes, and/or systems described herein.

Figure 2:
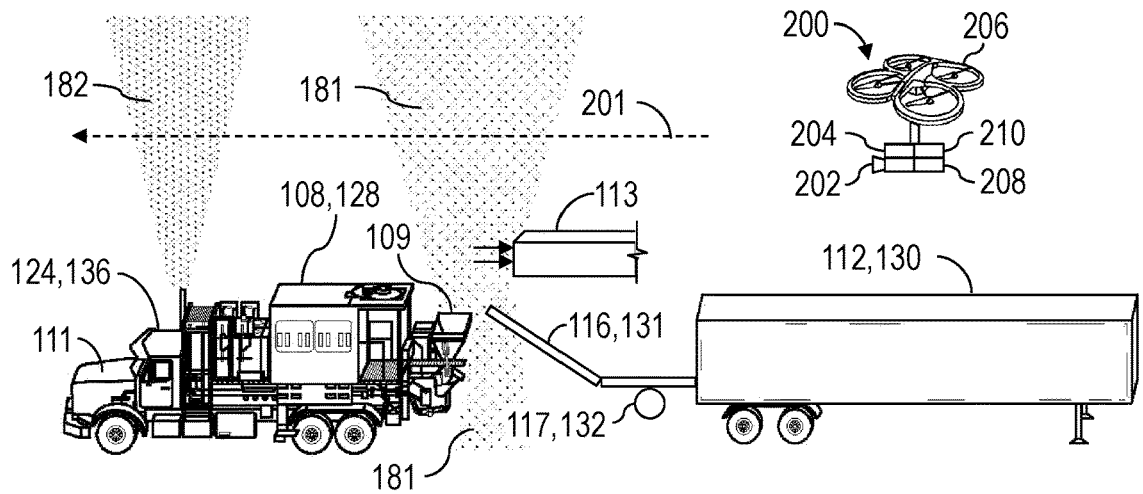
FIG. 2 is a schematic view of at least a portion of an example implementation of apparatus according to one or more aspects of the present disclosure.
Figure 3:
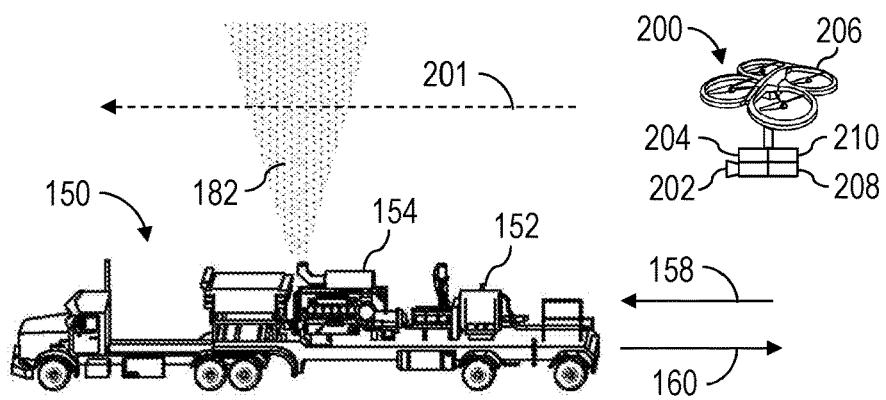
FIG. 3 is a schematic view of at least a portion of an example implementation of apparatus according to one or more aspects of the present disclosure.
Figure 4:
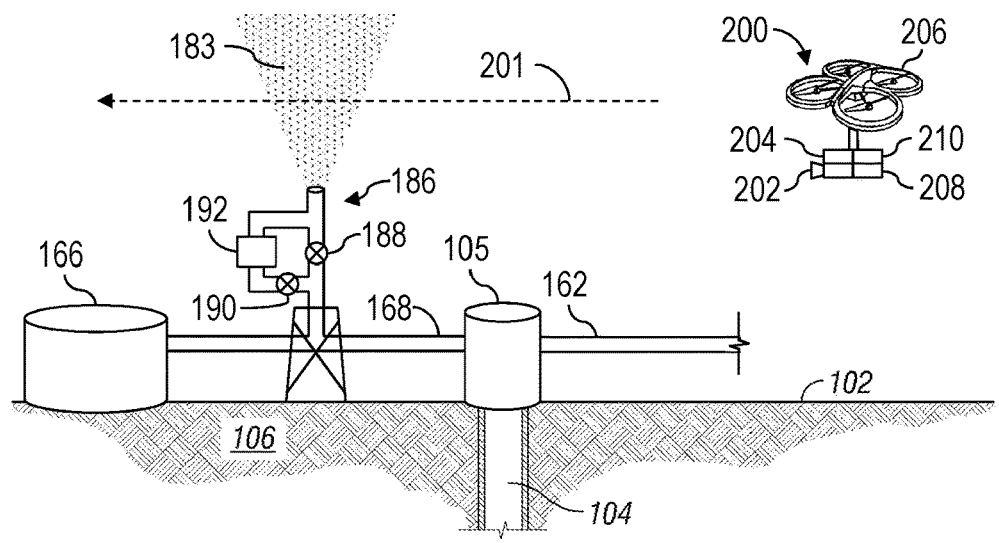
FIG. 4 is a schematic view of at least a portion of an example implementation of apparatus according to one or more aspects of the present disclosure.

FIGS. 2-4 are schematic views of portions of the wellsite system 100 shown in FIG. 1 during wellsite operations according to one or more aspects of the present disclosure. The following description refers to FIGS. 1-4, collectively.

FIG. 2 shows one of the mixers 108, 128 receiving dry particulate ingredient or material (e.g., sand, silica, guar, fiber, chemical additives, cement, etc.) from the corresponding container 112, 130 via the material transfer device 116, 131, which may be actuated by the corresponding prime mover 117, 132. The material transfer device 116, 131 may propel or eject a portion of the particulate material into the airspace and form a particulate material dust plume 181 around and above the material transfer device 116, 131 and a mixer chute 109. The particulate material dust plume 181 formation may be exacerbated by different circumstances. For example, if the material transfer device 116, 131 is not properly aligned with the chute 109, the material transfer device 116, 131 may eject or thrust the particulate material into the airspace and onto the wellsite surface 102, increasing the rate of plume formation. Also, if the mixer 108, 128 is running dry or is supplied with low quantities of liquid while the material transfer device 116, 131 is delivering the particulate material from the container 112, 130 at full rate, a substantial portion of particulate material may be ejected into the airspace, increasing the rate at which the particulate material dust plume 181 forms.

Furthermore, the mixing operations performed by the mixers 108, 128 may be actuated by a hydrocarbon burning engine 111 within the truck 124, 136, which may emit harmful gasses 182 and other pollutants into the airspace above and around the mixers 108, 128. As described above, the engine 111 may release carbon monoxide, carbon dioxide, nitrous oxide, VOCs, greenhouse gasses, and other gasses into the airspace.

The aerial emissions sensing device 200 may be operable to fly along the flightpath 201 through airspace above and/or around the mixers 108, 128 and the material transfer devices 116, 131 and monitor the levels and/or concentrations of airborne emissions released into the airspace. One or more of the particle and gas sensors 202, 204 may be operable to detect the presence and/or concentrations of the airborne particulate material 181 and gasses 182 along the flight path 201. The signals or information generated by the sensors 202, 204 may be processed by the controller 210 to generate a monitor signal or information based on the sensor signals and transmitted in real time to the control center 170 via the transceiver 208 while the aerial emissions sensing device 200 is flying along the flight path 201. The control center 170 may receive the monitor signal via a communications router 217 (e.g., wireless transceiver) (shown in FIG. 5) and further process the monitor signal to determine the concentration of the particulate material 181 and gasses 182 and operate the wellsite equipment based on the determined concentrations of the airborne particulate material 181 and gasses 182. The control center 170 may process the monitor signal and operate the wellsite equipment in real time while the control center 170 is receiving the monitor signal from the emissions sensing device 200.

If the determined concentrations of the emissions are above predetermined target thresholds or ranges, the control center 170 may shut down or adjust rates of operation of the material transfer devices 116, 131, the mixers 108, 128, and/or other wellsite equipment to reduce such emission concentrations. For example, the control center 170 may automatically adjust the operational rate of the prime movers 117, 132 to adjust the transfer rate of the dry particulate material into the mixers 108, 128. If the delivery of water is low and the mixers are running dry, the control center 170 may increase water delivery or decrease the transfer rate of the dry particulate material into the mixers 108, 128. The control center 170 may also automatically initiate and/or adjust operation of a vacuum/filtration system 113 to draw in the airborne particulate material 181 at the point of dispersion and filter out the airborne particulate material 181 from the air circulated through the vacuum/filtration system 113. The control center 170 may be further operable to activate or display an alert when the concentrations of the emissions are above the predetermined target thresholds or ranges. The alert may inform human operators to perform predetermined tasks or adjust operation of certain wellsite equipment to reduce the rates of airborne particulate material 181 and gas 182 emissions. For example, an alert may inform the operators to check and/or adjust the alignment between the material transfer devices 116, 131 and the corresponding chutes 109 of the mixers 108, 128. If the determined gas concentrations are above the predetermined target thresholds or ranges, the control center 170 may also automatically reduce operational rate of the engines 111 to reduce the rate of mixing operations and, thus, reduce concentrations of the gasses 182 below the predetermined target thresholds or ranges.

FIG. 3 shows one of the pumping units 150 during wellbore fracturing operations, wherein the pump 152 receives the fracturing fluid via the conduit 158 and discharges the fracturing fluid under pressure via the conduit 160 for injection into the wellbore 104. Such operations may be powered or actuated by a hydrocarbon burning engine 154, which may emit harmful gasses 182 into the airspace above and around the pumping unit 150. As described above, the engine 154 may release carbon monoxide, carbon dioxide, nitrous oxide, VOCs, greenhouse gasses, and other gasses into the airspace.

The aerial emissions sensing device 200 may be operable to fly along the flightpath 201 through airspace above and/or around the pumping units 150 and monitor the amount and/or concentrations of airborne emissions released into the airspace. The gas sensor 204 may be operable to detect the levels and/or concentrations of the gasses 182 along the flight path 201. The sensor signal generated by the gas sensor 204 may be processed by the controller 210 to generate a monitor signal or information based on the sensor signal and transmitted in real time to the control center 170 via the transceiver 208 while the aerial emissions sensing device 200 is flying along the flight path 201. The control center 170 may receive the monitor signal via the communications router 217 and further process the monitor signal to determine the concentration of the gasses 182 and operate the wellsite equipment based on the determined concentrations of such gasses 182. The control center 170 may process the monitor signal and operate the wellsite equipment in real time while the control center 170 is receiving the monitor signal from the emissions sensing device 200.

If the determined concentrations of the gasses 182 are above predetermined target thresholds or ranges, the control center 170 may shut down or adjust rate of operation of the pumping units 150 and/or other wellsite equipment to reduce such emission concentrations. For example, the control center 170 may automatically adjust the operational rate of the engines 154 and, thus, adjust the rate of injection operations to reduce the rate of gas emissions into the airspace.

FIG. 4 shows the wellbore 104 extending into the rock formation 106 and terminating with a wellhead/blow-out-preventer (BOP) 105 at the wellsite surface 102. The wellhead/BOP 105 may be fluidly connected with the conduit 162 operable to deliver various fluids and/or mixtures into the wellbore 104 and with the conduit 168 operable to convey wellbore fluids, gasses, and/or mixtures ejected from the wellbore 104 into the container 166. Gasses 183 ejected from the well 104 may be exhausted into the airspace above the wellsite surface 102 via an exhaust stack 186. As described above, gasses ejected from the wellbore 104 may include methane, hydrogen sulfide, smog-forming VOCs, and other greenhouse gasses.

The aerial emissions sensing device 200 may be operable to fly along the flightpath 201 through airspace above and/or around the exhaust stack 186 and monitor the level and/or concentrations of gasses 183 released into the airspace via the gas sensor 204. The sensor signal generated by the gas sensor 204 may be processed by the controller 210 to generate a monitor signal or information based on the sensor signal and transmitted in real time to the control center 170 via the transceiver 208 while the aerial emissions sensing device 200 is flying along the flight path 201. The control center 170 may receive the monitor signal via the communications router 217 and further process the monitor signal to determine the concentration of the gasses 183 and operate the wellsite equipment based on the determined concentrations of such gasses 183. The control center 170 may process the monitor signal and operate the wellsite equipment in real time while the control center 170 is receiving the monitor signal from the emissions sensing device 200.

If the determined concentrations of the gasses 183 are above the predetermined target thresholds or ranges, the control center 170 may operate a fluid valve 188 to reduce or prevent the gasses from being exhausted into the airspace and convey the gasses into the container 166. The control center 170 may also operate a fluid valve 190 to convey the gasses 183 through a catalyzer or filter 192, which may reduce the amount of pollutants exhausted or convert the gasses into other less harmful gasses, such as via a redox reaction. The control center 170 may also operate the wellhead/BOP 105 to shut off fluid flow into and/or out of the wellbore 104, such as until the gasses 183 may be evacuated from the wellbore 104 by alternate means.

Figure 5:
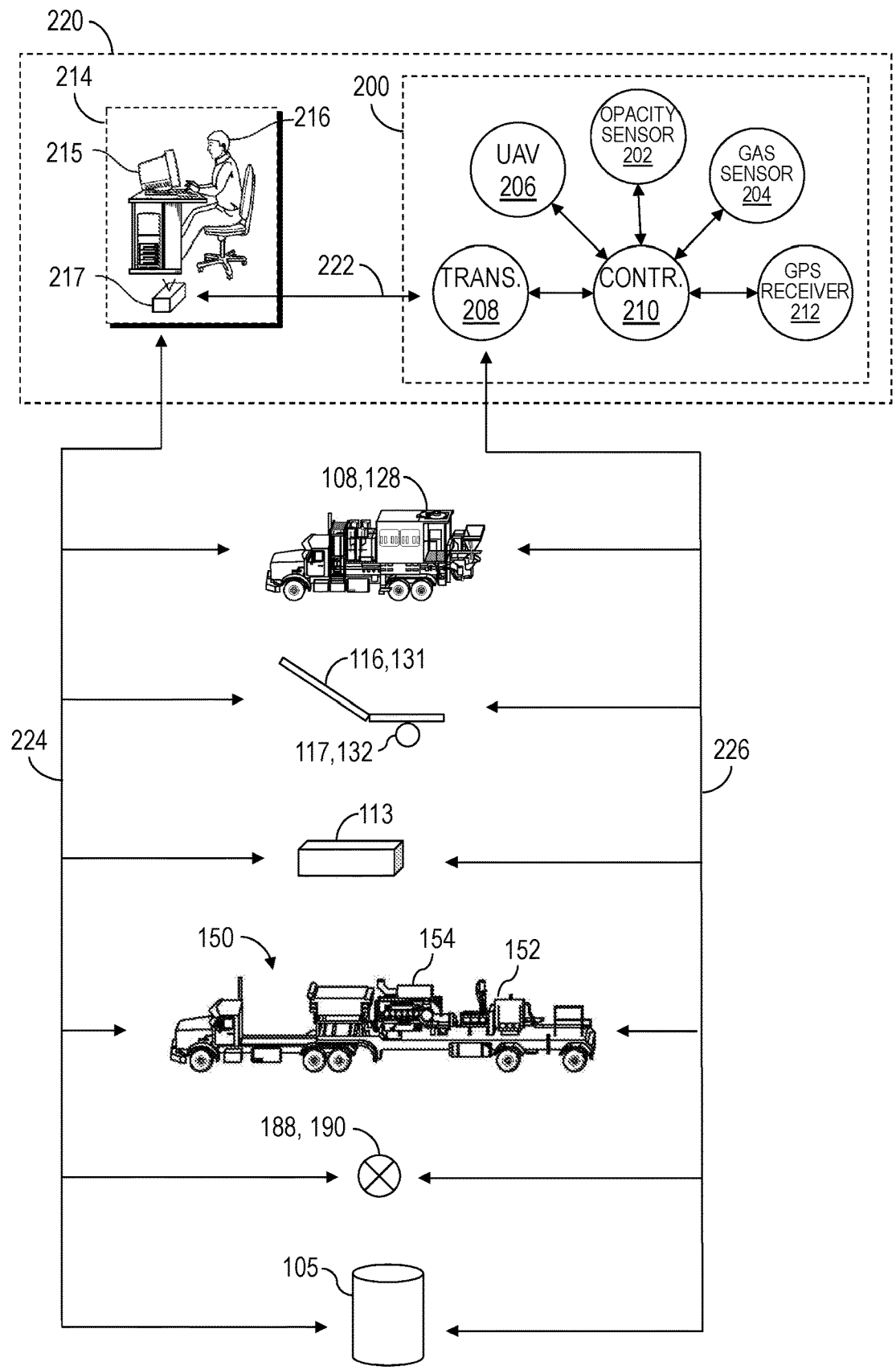
FIG. 5 is a schematic view of at least a portion of an example implementation of apparatus according to one or more aspects of the present disclosure.

FIG. 5 is a system level view of at least a portion of an example implementation of an emissions monitoring system 220 according to one or more aspects of the present disclosure. The figure shows various communication paths between the emission monitoring system 220 and various wellsite equipment described above. However, more or fewer communication paths may be implemented in different examples, such as with a different implementation of wellsite equipment.

The emissions monitoring system 220 may comprise the aerial emissions sensing device 200. As described above, the aerial emissions sensing device 200 may comprise the controller 210 communicatively connected with the particle sensor 202, the gas sensor 204, the GPS receiver 212, the UAV 206, and the transceiver 208. Communication between such components may be facilitated via a wired connection, such as using a Universal Serial Bus (USB) connection and protocol or the like, and/or by a wireless connection, such as Bluetooth or Wi-Fi, or the like. During aerial emission sensing operations, the controller 210 may operate the UAV 206 to fly the emissions sensing device 200 along the predetermined flight path 201 through the airspace above the wellsite system 100. The flight path may be corrected against the GPS information received by the GPS receiver 212. The controller 210 may also receive the sensor signal, such as the opacity signal or the digital visible image generated by the sensor 202 and the gas signal generated by the gas sensor 204, process the sensor signal to generate the monitor signal, and transmit the monitor signal wirelessly via the wireless transceiver 208 to a control center 214 via the communication path 222.

The control center 214 (e.g., control center 170 in FIG. 1) of the emissions monitoring system 220 may comprise a computer 215 operated by a human operator 216. The computer 215 may be operable to send and receive signals or information to and from a remote location via the communications router 217 (e.g., a wireless transceiver). The communications router 217 may serve as an access point for communicating with the aerial emissions sensing device 200 and the various pieces of wellsite equipment, as well as a gateway to permit the control center 214 to communicate with an offsite control center (not shown). The control center 214 may receive the monitor signal and/or GPS location information from the aerial emissions sensing device 200 via the communications router 217. The computer 215 may process the monitor signal to detect levels or concentrations of airborne particulate material 181 and/or gasses 182, 183 in the airspace and compare the detected levels or concentrations to the predetermined target concentration thresholds or ranges to determine whether the detected levels or concentrations are within or above the target concentration thresholds or ranges. Based on the comparison results and/or detected emission levels or concentrations, the computer 215 may automatically generate and transmit an output signal via a communication path 224 to operate or cause a change in an operational parameter of one or more pieces of the wellsite equipment. The human operator 216 may also or instead manually operate the one or more pieces of wellsite equipment via the computer 215 based on the comparison results and/or detected emission levels or concentrations. The communication path 224 between the control center 214 and the wellsite equipment may be a wired communication path. However, if one or more pieces of wellsite equipment are capable of wireless communication, one or more portions of the communication path 224 may be a wireless communication path.

If the detected levels or concentrations of the airborne particulate material 181 and/or gasses 182, 183 are below the predetermined target threshold or range, the computer 215 may increase the rate of wellsite operations, such as by increasing the mixing rate of the mixers 108, 128, increase the operational rate of the prime movers 117, 132 of the material transfer devices 116, 131 to increase the transfer rate of the dry particulate material into the mixers 108, 128, and increase the operational rate of the engines 154 to increase the injection rate of the mixture via the pumps 152. The computer 215 may also deactivate or decrease rate of operation of the vacuum/filtration system 113. If the detected emission levels or concentrations of particulate material 181 and/or gasses 182, 183 are within the predetermined target range, the computer 215 may maintain the rate of wellsite operations substantially constant. However, if the detected levels or concentrations of the airborne particulate material 181 and/or gasses 182, 183 are above the predetermined target threshold or range, the computer 215 may automatically decrease the rate of wellsite operations. For example, the computer 215 may decrease the mixing rate of the mixers 108, 128, decrease the operational rate of the prime movers 117, 132 of the material transfer devices 116, 131 to decrease the transfer rate of the dry particulate material into the mixers 108, 128, and decrease the operational rate of the engines 154 to decrease the injection rate of the mixture via the pumps 152. The computer 215 may also initiate or increase rate of operation of the vacuum/filtration system 113 to draw in and filter out the airborne particulate material 181. The computer 215 may also automatically operate the fluid valves 188, 190 to divert the wellbore gasses 183 being exhausted into the airspace through the catalyzer or filter 192 or into the container 166. The computer 215 may also transmit an output signal to the wellhead/BOP 105 to activate one or more fluid valves (not shown) to shut off fluid flow through the wellhead/BOP 105.

Although the computer 215 of the control center 214 is described as processing the monitor signal to detect the levels or concentrations of the emissions in the airspace and compare the detected levels or concentrations to the predetermined target concentration threshold or range to determine whether the emissions are above or within the predetermined target threshold or range, it is to be understood that the controller 210 of the aerial emissions sensing device 200 may also or instead perform one or both of these operations in same or similar manner as the computer 215. Accordingly, the monitor signal may be or comprise the signals generated by the sensors 202, 204, including the opacity signal, the gas signal, and/or the digital visible image. Thus, the controller 210 may receive and process the monitor signal to detect levels or concentrations of the airborne particulate material 181 and/or gasses 182, 183 in the airspace and compare the detected levels or concentrations to the predetermined target concentration thresholds or ranges to determine whether the detected levels or concentrations are within or above the target concentration thresholds or ranges. Based on the comparison results and/or detected emission levels or concentrations, the controller 210 may automatically generate and transmit an output control signal directly to the wellsite equipment via a communication path 226 to operate or adjust the operation of the wellsite equipment. The communication path 226 between the controller 210 and the wellsite equipment may be a wireless communication path. However, if one or more pieces of wellsite equipment are not capable of wireless communication, the output signal to such wellsite equipment may be transmitted through the control center 214 via communication paths 222, 224. Accordingly, redundancy of communication may be achieved by facilitating both direct communication via communication path 226 and indirect communication via communication paths 222, 224. Furthermore, if the aerial emissions sensing device 200 is mounted on a fixed structure, the communication path 226 may be a wired communication path.

It is to be further understood that both the computer 215 and the controller 210 may perform some of the operations described above. For example, the controller 210 may process the monitor signal to detect levels or concentrations of particulate material 181 and/or gasses 182, 183 in the airspace, while the computer 215 may compare the detected levels or concentrations to the predetermined target concentration thresholds or ranges to determine whether the detected levels or concentrations are within or above the target concentration thresholds or ranges and automatically generate and transmit the output control signal via the communication path 224 to operate one or more pieces of the wellsite equipment.

Furthermore, although the computer 215 and the controller 210 are described as processing the sensor or monitor signals to detect the levels or concentrations of the emissions in the airspace, it is to be understood that one or both of the sensors 202, 204 may generate the sensor signals or information that is readily indicative of emission levels or concentrations without further processing or modification. Accordingly, such information may be readily compared to the predetermined emission levels or concentrations by the computer 215 and/or the controller 210 to determine whether the detected levels or concentrations are within or above the predetermined target concentration thresholds or ranges.

One of ordinary skill in the art will readily understand how communications as described above may be implemented, including the hardware within the various illustrated components and/or intervening between the various illustrated components, and hence, further details are omitted for brevity. Currently known and future-developed types of communication are within the scope of the present disclosure.

Figure 6:
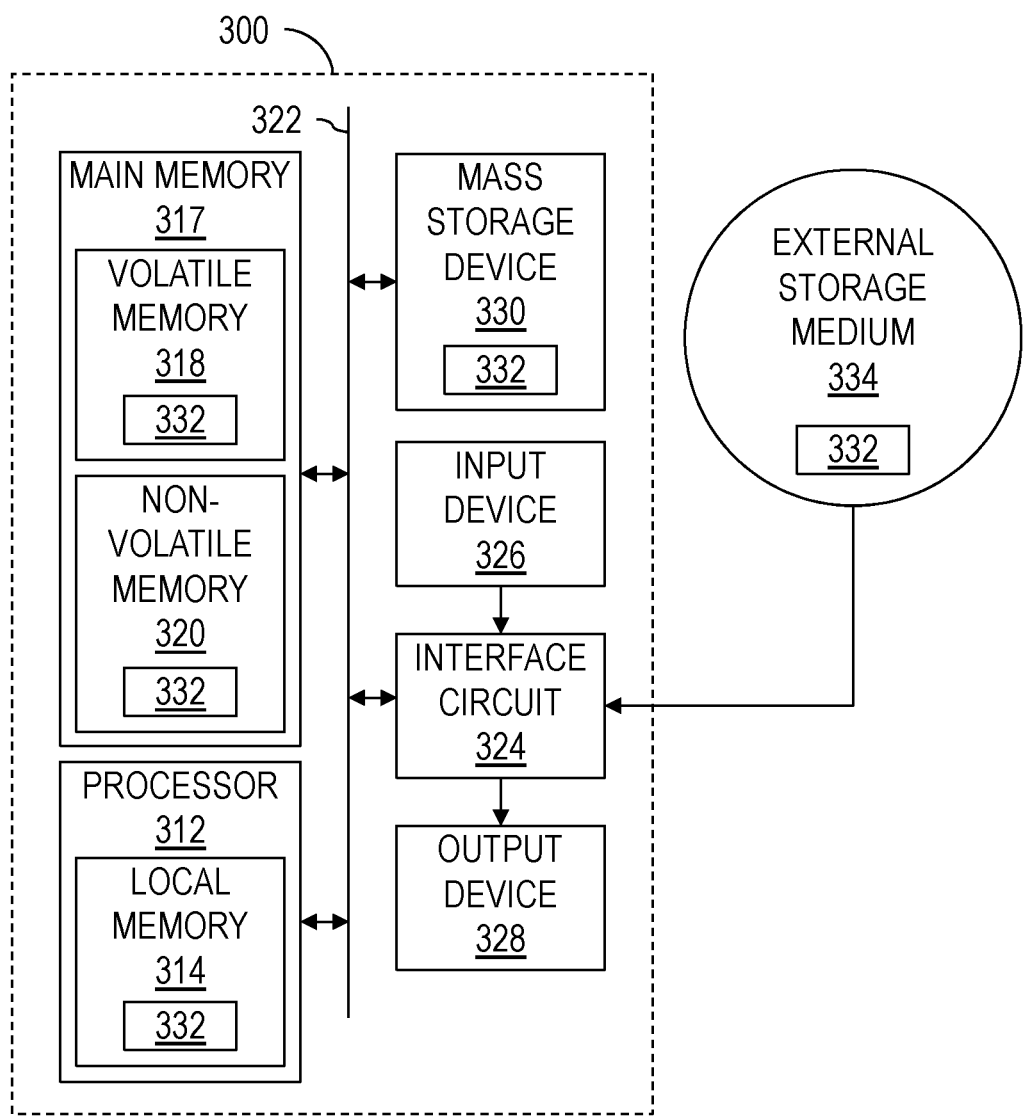
FIG. 6 is a schematic view of at least a portion of an example implementation of apparatus according to one or more aspects of the present disclosure.

FIG. 6 is a schematic view of at least a portion of an apparatus of an emissions monitoring system according to one or more aspects of the present disclosure. The apparatus may form at least a portion of a sensor, a communication device, a controller, a computer, and/or an aerial emissions sensing device, among other things, of the emissions monitoring system. The apparatus is or comprises a processing system that may further include one or more processing devices 300 that may execute example machine-readable instructions to implement at least a portion of one or more of the methods and/or processes described herein. In some examples, the processing system may be one processing device 300 that implements the example methods and processes described herein. In other examples, the processing system and various functionalities may be distributed across multiple different processing devices 300. For example, functionality of various methods or processes described herein, as implemented by program instructions or computer program code executed by an associated processor, may be performed across multiple different processing devices 300, which may be located within or form one or more of the sensors 202, 204, the controller 210, the computer 215, and the control center 170, 214 shown in one or more of the FIGS. 1-5.

The processing device 300 may be or comprise, for example, one or more processors, controllers, special-purpose computing devices, servers, personal computers, personal digital assistant (PDA) devices, smartphones, smart glasses, tablets, internet appliances, and/or other types of computing devices. Moreover, while it is possible that the entirety of the processing device 300 shown in FIG. 6 is implemented within the apparatus, it is also contemplated that one or more components or functions of the processing device 300 may be external to the processing device 300.

The processing device 300 may comprise a processor 312, such as, for example, a general-purpose programmable processor. The processor 312 may comprise a local memory 314, and may execute coded instructions 332 present in the local memory 314 and/or another memory device. The processor 312 may execute, among other things, machine-readable instructions or programs to implement the methods and/or processes described herein. The programs stored in the local memory 314 may include program instructions or computer program code that, when executed by an associated processor, facilitate emissions monitoring and control of one or more pieces of wellsite equipment as described herein. The processor 312 may be, comprise, or be implemented by one or a plurality of processors of various types suitable to the local application environment, and may include one or more of general- or special-purpose computers, microprocessors, digital signal processors (DSPs), field-programmable gate arrays (FPGAs), application-specific integrated circuits (ASICs), and processors based on a multi-core processor architecture, as non-limiting examples. Other processors from other families are also appropriate.

The processor 312 may be in communication with a main memory 317, such as may include a volatile memory 318 and a non-volatile memory 320, perhaps via a bus 322 and/or other communication means. The volatile memory 318 may be, comprise, or be implemented by tangible, non-transitory storage, such as random access memory (RAM), static random access memory (SRAM), synchronous dynamic random access memory (SDRAM), dynamic random access memory (DRAM), RAMBUS dynamic random access memory (RDRAM) and/or other types of random access memory devices. The non-volatile memory 320 may be, comprise, or be implemented by tangible, non-transitory storage, such as read-only memory, flash memory and/or other types of memory devices. Various types of tangible, non-transitory memory or storage device may be implemented as the volatile memory 318 and the non-volatile memory 320. One or more memory controllers (not shown) may control access to the volatile memory 318 and/or the non-volatile memory 320.

The processing device 300 may also comprise an interface circuit 324. The interface circuit 324 may be, comprise, or be implemented by various types of standard interfaces, such as an Ethernet interface, a universal serial bus (USB), a third generation input/output (3GIO) interface, a wireless interface, a satellite interface, a global positioning system (GPS) and/or a cellular interface or receiver, among others. The interface circuit 324 may also comprise a graphics driver card. The interface circuit 324 may also comprise a device, such as a modem or network interface card to facilitate exchange of data with external computing devices via a network (e.g., Ethernet connection, digital subscriber line (DSL), telephone line, coaxial cable, cellular telephone system, satellite, etc.).

One or more input devices 326 may be connected to the interface circuit 324. The input device(s) 326 may permit the human operator 216 to enter the coded instructions 332, including control commands, operational set-points, and/or other data for use by the processor 312. The operational set-points may include, as non-limiting examples, geographic coordinates or other information indicative of the flight path 201 of the aerial emissions sensing device 200, the particulate material 181 concentration target thresholds or ranges, and the gas 182, 183 concentration target thresholds or ranges, such as to control operation of the aerial emissions sensing device 200 and other wellsite equipment described herein. The input device(s) 326 may be, comprise, or be implemented by, for example, a keyboard, a mouse, a touchscreen, a track-pad, a trackball, an isopoint, and/or a voice recognition system, among others.

One or more output devices 328 may also be connected to the interface circuit 324. The output devices 328 may be, comprise, or be implemented by, for example, display devices (e.g., a light-emitting diode (LED) display, a liquid crystal display (LCD, or a cathode ray tube (CRT) display, among others), printers, and/or speakers, among others.

The processing device 300 may also comprise one or more mass storage devices 330 for storing machine-readable instructions and data. Examples of such mass storage devices 330 include tangible, non-transitory storage, such as floppy disk drives, hard drive disks, compact disk (CD) drives, and digital versatile disk (DVD) drives, among others. The coded instructions 332 may be stored in the mass storage device 330, the main memory 317, the local memory 314, and/or on a removable storage medium 334, such as a CD or DVD. Thus, the modules and/or other components of the processing device 300 may be implemented in accordance with hardware (embodied in one or more chips including an integrated circuit, such as an ASIC), or may be implemented as software or firmware for execution by a processor. In particular, in the case of firmware or software, the embodiment may be provided as a computer program product including a computer readable medium or storage structure embodying computer program code (i.e., software or firmware) thereon for execution by the processor.

The coded instructions 332 may include program instructions or computer program code that, when executed by the processor 312, may cause the aerial emissions sensing device 200 and the various pieces of wellsite equipment of the wellsite system 100 to perform methods, processes, and/or routines described herein. For example, the controller 300 may receive, process, and record the operational set-points and commands entered by the human operator 216 and the sensor signals generated by the emission sensors 202, 204 and the GPS receiver 212. The controller 300 may then transmit the monitor signal generated based on the sensor signal via the transceiver 208. The controller 300 may process the monitor signal to detect levels or concentrations of particulate material 181 and/or gasses 182, 183 in the airspace and compare the detected levels or concentrations to the predetermined target concentration thresholds or ranges to determine whether the detected levels or concentrations are within or above the target concentration thresholds or ranges. Based on the received operational set-points, commands, and comparison results and/or detected emission levels or concentrations, the controller 300 may automatically generate and transmit an output control signal via the transceiver 208 or communications router 217 to operate one or more pieces of the wellsite equipment, such as the mixers 108, 128, the material transfer devices 116, 131, the vacuum/filtration system 113, the pumping units 150, the exhaust stack valves 188, 190, and/or the wellhead/BOP 105 to operate and/or adjust operation of such wellsite equipment and, in turn, adjust rates of particulate material and gas emissions. The controller 300 may be operable to receive and process the sensor or monitor signals and transmit the output control signal to one or more pieces of wellsite equipment to cause the operational parameter change in real-time while the aerial emissions sensing device 200 is operating in the airspace. However, the controller 300 may also store the sensor signals in the memory for later download.

The following methods or processes may be for emissions monitoring and control at a worksite, such as the wellsite system 100 or another worksite. The methods or processes are discussed in the context of devices and components discussed above with respect to the foregoing figures, although in other implementations, methods or processes within the scope of this disclosure may be performed in the context of other devices and components. The methods or processes discussed below are illustrated in a given order, and in other implementations, methods or processes may be performed in other orders within the scope of the present disclosure. For example, some aspects may be performed in different orders or in parallel, among others. Further, consistent with the scope of this disclosure, various other modifications may be made to the methods or processes discussed below. For example, some implementations may use different algorithms or processes from what is discussed below. Additionally, methods or processes within the scope of this disclosure may include additional or fewer determinations, computations, logic, monitoring, etc.

Figure 7:
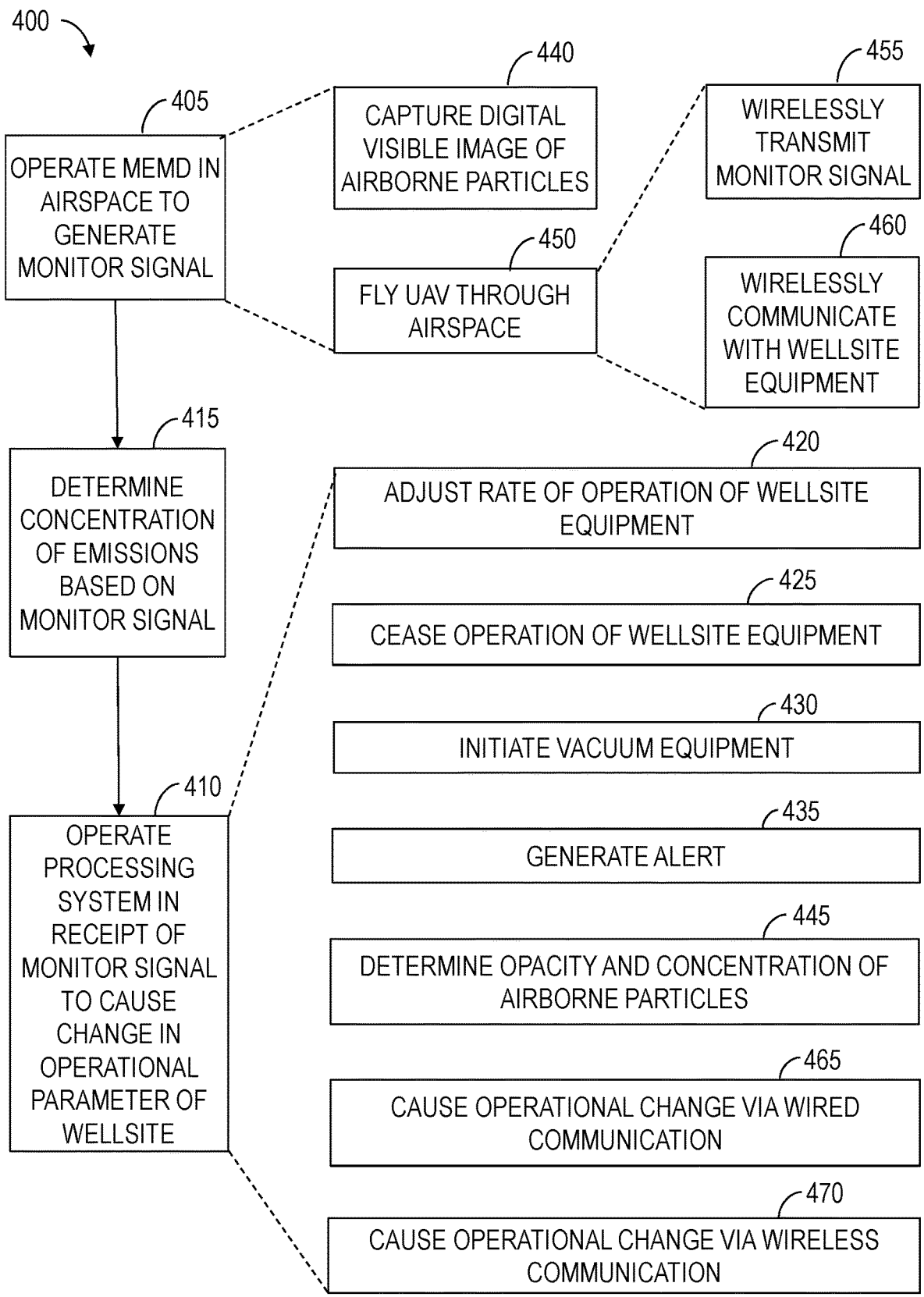
FIG. 7 is a flow-chart diagram of at least a portion of an example implementation of a method according to one or more aspects of the present disclosure.

FIG. 7 is a flow-chart diagram of at least a portion of an example implementation of a method (400) according to one or more aspects of the present disclosure. The method (400) may be performed utilizing or otherwise in conjunction with at least a portion of one or more implementations of one or more instances of the apparatus shown in one or more of FIGS. 1-6 and/or otherwise within the scope of the present disclosure. For example, the method (400) may be performed and/or caused, at least partially, by the controller 300 executing the coded instructions 332 according to one or more aspects of the present disclosure. Thus, the following description of the method (400) also refers to apparatus shown in one or more of FIGS. 1-6. However, the method (400) may also be performed in conjunction with implementations of apparatus other than those depicted in FIGS. 1-6 that are also within the scope of the present disclosure.

The method (400) may include operating (405) an aerial or otherwise mobile emissions monitoring device (MEMD) 200 in airspace above a wellsite 100 to generate and transmit a monitor signal related to emissions 181-183 in the airspace, wherein the emissions 181-183 may be associated with wellsite equipment at the wellsite 100. The method (400) may further include operating (410) a processing system 300 in receipt of the monitor signal to cause a change in an operational parameter of the wellsite equipment based on information conveyed by the monitor signal, wherein the processing system 300 may comprise a processor 312 and a memory 317 including computer program code 332. The processing system 300 may receive the monitor signal and cause the operational parameter change in real-time while the MEMD 200 is operating in the airspace. The processing system 300 may cause (465) the operational parameter change via wired communication with the wellsite equipment and/or the processing system (300) may cause (470) the operational parameter change via wireless communication with the wellsite equipment. The wellsite 100 may be a hydraulic fracturing wellsite.

The method (400) may also include determining (415) a concentration of the emissions based on the monitor signal, whereby operating (410) the processing system 300 to cause the operational parameter change may include operating the processing system to cause the operational parameter change based on the determined concentration.

The operational parameter change caused by operating (410) of the processing system 300 may include adjustment (420) of a rate of operation of a component of the wellsite equipment in response to the determined concentration (415) exceeding a predetermined threshold. The wellsite equipment may be or comprise one or more of a sand delivery system, a guar delivery system, a fiber delivery system, a chemical additive delivery system, and/or a cement delivery system. The operational parameter change may comprise a cessation (425) of operation of a component of the wellsite equipment in response to the determined concentration (415)

exceeding a predetermined threshold. Another operational parameter change may comprise an initiation (430) of vacuum equipment 113 at the wellsite 100 in response to the determined concentration (415) exceeding a predetermined threshold. Operating (410) the processing system 300 may further comprise generating (435) an alert in response to the determined concentration (415) exceeding a predetermined threshold.

Within the context of the method (400), the emissions may comprise airborne particles 181 of a compositional component of a fluid for treatment of a subterranean formation, and the monitor signal may include information related to opacity of the airborne particles 181. The airborne particles 181 may be or comprise one or more of cement dust, guar dust, fiber dust, chemical additive dust, silica dust, and/or sand dust.

When the emissions comprise airborne particles 181 of a compositional component of a fluid for treatment of a subterranean formation, operating (405) the MEMD 200 may comprise capturing (440) a digital visible image of the airborne particles 181 and the monitor signal may include information related to the captured digital visible image. Operating the processing system (410) may also comprise determining (445) opacity of the airborne particles 181 based on the information related to the captured digital visible image and determining a concentration of the airborne particles 181 based on the determined opacity.

Within the context of the method (400), the emissions may comprise a gas released from the wellsite 100 or the wellsite equipment, and the monitor signal may include information related to the gas. The gas may be or comprise one or more of methane, carbon monoxide, carbon dioxide, hydrogen sulfide, nitrous oxide, and/or VOCs.

An unmanned aerial vehicle (UAV) 206 may be or comprise the MEMD 200, and wherein operating the MEMD 200 may comprise flying (450) the UAV through the airspace. The UAV may wirelessly transmit (455) the monitor signal for reception by the processing system 300. The UAV may comprise at least a portion of the processing system 300, which may wirelessly communicate (460) with the wellsite equipment to cause the operational parameter change.

In view of the entirety of the present disclosure, including the figures and the claims, a person having ordinary skill in the art should readily recognize that the present disclosure introduces an apparatus comprising: an unmanned aerial vehicle (UAV) operable to fly through airspace above a wellsite and transmit a monitor signal related to emissions in the airspace, wherein the emissions are associated with wellsite equipment at the wellsite; and a processing system comprising a processor and a memory including computer program code, wherein the processing system is operable to cause a change in an operational parameter of the wellsite equipment based on the monitor signal received from the UAV.

The processing system may be operable to: determine a concentration of the emissions based on the received monitor signal; and cause the operational parameter change based on the determined concentration.

The UAV may be operable to determine a concentration of the emissions, and the monitor signal may be related to the determined concentration.

The processing system and/or the UAV may be operable to determine a concentration of the emissions, the processing system and/or the UAV may be operable to compare the determined concentration to a predetermined threshold, and the processing system may be operable to cause the operational parameter change based on the comparison. In such implementations, among others within the scope of the present disclosure, the operational parameter change may be an adjustment of a rate of operation of the wellsite equipment. For example, the wellsite equipment may be or comprise one or more of a sand delivery system, a silica delivery system, a guar delivery system, a fiber delivery system, a chemical additive delivery system, and/or a cement delivery system, and the adjustment may be a decrease in the rate of operation in response to the determined concentration being above the predetermined threshold. The operational parameter change may also or instead be ceasing operation of the wellsite equipment in response to the determined concentration being above the predetermined threshold. The operational parameter change may also or instead be initiating operation of vacuum equipment at the wellsite in response to the concentration being above the predetermined threshold. The processing system may be operable to generate an alert in response to the concentration being above the predetermined threshold.

The emissions may comprise airborne particles of a compositional component of a fluid for treatment of a subterranean formation, the UAV may comprise an opacity sensor operable to generate an opacity signal indicative of opacity of the airborne particles, and the monitor signal may be, comprise, or be generated based at least partially on the opacity signal. In such implementations, among others within the scope of the present disclosure, the processing system and/or the UAV may be operable to determine a concentration of the airborne particles based on the opacity signal and/or the monitor signal, and the processing system may be operable to cause the operational parameter change based on the determined concentration. For example, the airborne particles may comprise one or more of cement dust, guar dust, fiber dust, chemical additive dust, silica dust, and/or sand dust.

The emissions may comprise airborne particles of a compositional component of a fluid for treatment of a subterranean formation, the UAV may comprise an image-capturing device operable to capture a digital visible image of the airborne particles, and the monitor signal may be, comprise, or be generated based at least partially on the digital visible image. In such implementations, among others within the scope of the present disclosure, the processing system and/or the UAV may be operable to determine opacity of the airborne particles based on the digital visible image and/or the monitor signal, and determine a concentration of the airborne particles based on the determined opacity, and the processing system may be operable to cause the operational parameter change based on the determined concentration.

The emissions may comprise a gas released from the wellsite or the wellsite equipment, the UAV may comprise a gas sensor operable to generate a gas signal indicative of the gas, and the monitor signal may be, comprise, or be generated based at least partially on the gas signal. In such implementations, among others within the scope of the present disclosure, the processing system and/or the UAV may be operable to determine a concentration of the gas based on the gas signal and/or the monitor signal, and the processing system may be operable to cause the operational parameter change based on the determined concentration. For example, the gas may be or comprise one or more of methane, carbon monoxide, carbon dioxide, hydrogen sulfide, nitrous oxide, and/or volatile organic compounds (VOC).

The wellsite may be a hydraulic fracturing wellsite.

The processing system may be operable to operate the wellsite equipment in real-time as the UAV is flying through the airspace.

The UAV may comprise a transmitter operable to wirelessly transmit the monitor signal, and the apparatus may further comprise a wireless receiver located at the wellsite and operable to receive the monitor signal.

The processing system may be wirelessly communicatively connected with the wellsite equipment.

The processing system may be at least partially located at the wellsite and communicatively connected with the wellsite equipment.

The present disclosure also introduces a method comprising: operating a mobile emissions monitoring device in airspace above a wellsite to generate and transmit a monitor signal related to emissions in the airspace, wherein the emissions are associated with wellsite equipment at the wellsite; and operating a processing system in receipt of the monitor signal to cause a change in an operational parameter of the wellsite equipment based on information conveyed by the monitor signal, wherein the processing system comprises a processor and a memory including computer program code.

The method may comprise determining a concentration of the emissions based on the monitor signal, and operating the processing system to cause the operational parameter change may comprise operating the processing system to cause the operational parameter change based on the determined concentration. The operational parameter change may comprise an adjustment of a rate of operation of a component of the wellsite equipment in response to the determined concentration exceeding a predetermined threshold. In such implementations, among others within the scope of the present disclosure, the wellsite equipment may be or comprise one or more of a sand delivery system, a guar delivery system, a fiber delivery system, a chemical additive delivery system, and/or a cement delivery system. The operational parameter change may comprise a cessation of operation of a component of the wellsite equipment in response to the determined concentration exceeding a predetermined threshold. The operational parameter change may comprise an initiation of vacuum equipment at the wellsite in response to the determined concentration exceeding a predetermined threshold. Operating the processing system may comprise generating an alert in response to the determined concentration exceeding a predetermined threshold.

The emissions may comprise airborne particles of a compositional component of a fluid for treatment of a subterranean formation, and the monitor signal may include information related to opacity of the airborne particles. For example, the airborne particles may comprise one or more of cement dust, guar dust, fiber dust, chemical additive dust, silica dust, and/or sand dust.

The emissions may comprise airborne particles of a compositional component of a fluid for treatment of a subterranean formation, operating the mobile emissions monitoring device may comprise capturing a digital visible image of the airborne particles, and the monitor signal may include information related to the captured digital visible image. In such implementations, among others within the scope of the present disclosure, operating the processing system may comprise determining opacity of the airborne particles based on the information related to the captured digital visible image, and determining a concentration of the airborne particles based on the determined opacity.

The emissions may comprise a gas released from the wellsite or the wellsite equipment, and the monitor signal may include information related to the gas. For example, the gas may be or comprise one or more of methane, carbon monoxide, carbon dioxide, hydrogen sulfide, nitrous oxide, and/or volatile organic compounds (VOC).

The wellsite may be a hydraulic fracturing wellsite.

The processing system may be operable to receive the monitor signal and cause the operational parameter change in real-time while the mobile emissions monitoring device is operating in the airspace.

An unmanned aerial vehicle (UAV) may be or comprise the mobile emissions monitoring device, and operating the mobile emissions monitoring device may comprise flying the UAV through the airspace. The UAV may wirelessly transmit the monitor signal for reception by the processing system. The UAV may comprise at least a portion of the processing system. The at least portion of the processing system may wirelessly communicate with the wellsite equipment to cause the operational parameter change.

The processing system may cause the operational parameter change via wired and/or wireless communication with the wellsite equipment.

The present disclosure also introduces a method comprising: flying an unmanned aerial vehicle (UAV) through an airspace above a wellsite; operating a plurality of wellsite equipment components at the wellsite; operating a sensor carried by the UAV to generate a wireless monitor signal related to emissions in the airspace; and adjusting the operation of one or more of the wellsite equipment components based on information conveyed in the monitor signal.

Adjusting the operation of the one or more wellsite equipment components may be performed while flying the UAV and operating the sensor in the airspace.

The one or more wellsite equipment components may comprise one or more of a sand delivery system, a guar delivery system, a fiber delivery system, a chemical additive delivery system, and/or a cement delivery system.

Adjusting the operation of the one or more wellsite equipment components may comprise operating a processing system comprising a processor and a memory including computer program code. Operating the processing system may comprise: receiving the monitor signal; generating an output signal based on the information conveyed in the monitor signal; and communicating the output signal to the one or more wellsite equipment components to cause the operational adjustment. Generating the output signal based on the information conveyed in the monitor signal may comprise: determining a concentration of the emissions in the airspace based on the information conveyed in the monitor signal; and generating the output signal based on the determined concentration. In such implementations, among others within the scope of the present disclosure, the operational adjustment may comprise an adjustment of a rate of operation of one or more of the wellsite equipment components in response to the determined concentration exceeding a predetermined threshold. The operational adjustment may also or instead comprise a cessation of operation of one or more of the wellsite equipment components in response to the determined concentration exceeding a predetermined threshold. The operational adjustment may also or instead comprise an initiation of vacuum equipment at the wellsite in response to the determined concentration exceeding a predetermined threshold. Operating the processing system may also comprise generating an alert in response to the determined concentration exceeding a predetermined threshold.

The emissions may comprise airborne particles of a compositional component of a fluid for treatment of a subterranean formation, and the monitor signal may include information related to opacity of the airborne particles. The airborne particles may comprise one or more of cement dust, guar dust, fiber dust, chemical additive dust, silica dust, and/or sand dust.

The emissions may comprise airborne particles of a compositional component of a fluid for treatment of a subterranean formation, operating the sensor may comprise capturing a digital visible image of the airborne particles, and the monitor signal may include information related to the captured digital visible image. In such implementations, among others within the scope of the present disclosure, operating the sensor may comprise: determining opacity of the airborne particles based on the information related to the captured digital visible image; and determining a concentration of the airborne particles based on the determined opacity.

The emissions may comprise a gas released from the wellsite or a gas-releasing one of the wellsite equipment components, and the monitor signal may include information related to the gas. For example, the gas may be or comprise one or more of methane, carbon monoxide, carbon dioxide, hydrogen sulfide, nitrous oxide, and/or volatile organic compounds (VOC). In such implementations, among others within the scope of the present disclosure, the operationally adjusted one or more of the wellsite equipment components may or may not include the gas-releasing one of the wellsite equipment components.

The wellsite may be a hydraulic fracturing wellsite.

The method may further comprise processing the monitor signal by a processing system. The UAV may carry at least a portion of the processing system. The processing system may cause the operational adjustment of the one or more wellsite equipment components via wired and/or wireless communication with the one or more wellsite equipment components.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
    an unmanned aerial vehicle (UAV) operable to fly through airspace above a wellsite and transmit a monitor signal related to emissions in the airspace, wherein the emissions are associated with wellsite equipment at the wellsite; and
    a processing system comprising a processor and a memory including computer program code, wherein the processing system is operable to cause a change in an operational parameter of the wellsite equipment based on the monitor signal received from the UAV.

2. The apparatus of claim 1 wherein the processing system is operable to:
    determine a concentration of the emissions based on the received monitor signal; and
    cause the operational parameter change based on the determined concentration.

3. The apparatus of claim 1 wherein the UAV is operable to determine a concentration of the emissions, and wherein the monitor signal is related to the determined concentration.

4. The apparatus of claim 1 wherein:
    the processing system or the UAV is operable to determine a concentration of the emissions;
    the processing system or the UAV is operable to compare the determined concentration to a predetermined threshold; and
    the processing system is operable to cause the operational parameter change based on the comparison.

5. The apparatus of claim 4 wherein the operational parameter change is an adjustment of a rate of operation of the wellsite equipment.

6. The apparatus of claim 5 wherein the wellsite equipment is or comprises one or more of a sand delivery system, a silica delivery system, a guar delivery system, a fiber delivery system, a chemical additive delivery system, and/or a cement delivery system, and wherein the adjustment is a decrease in the rate of operation in response to the determined concentration being above the predetermined threshold.

7. The apparatus of claim 4 wherein the operational parameter change is ceasing operation of the wellsite equipment in response to the determined concentration being above the predetermined threshold.

8. The apparatus of claim 4 wherein the operational parameter change is initiating operation of vacuum equipment at the wellsite in response to the concentration being above the predetermined threshold.

9. The apparatus of claim 4 wherein the processing system is operable to generate an alert in response to the concentration being above the predetermined threshold.

10. The apparatus of claim 1 wherein:
    the emissions comprise airborne particles of a compositional component of a fluid for treatment of a subterranean formation;
    the UAV comprises an opacity sensor operable to generate an opacity signal indicative of opacity of the airborne particles; and
    the monitor signal is, comprises, or is generated based at least partially on the opacity signal.

11. The apparatus of claim 10 wherein:
    the processing system or the UAV is operable to determine a concentration of the airborne particles based on the opacity signal or the monitor signal; and
    the processing system is operable to cause the operational parameter change based on the determined concentration.

12. The apparatus of claim 10 wherein the airborne particles comprise one or more of cement dust, guar dust, fiber dust, chemical additive dust, silica dust, and/or sand dust.

13. The apparatus of claim 1 wherein:
    the emissions comprise airborne particles of a compositional component of a fluid for treatment of a subterranean formation;
    the UAV comprises an image-capturing device operable to capture a digital visible image of the airborne particles; and the monitor signal is, comprises, or is generated based at least partially on the digital visible image.

14. The apparatus of claim 13 wherein the processing system or the UAV is operable to:
determine opacity of the airborne particles based on the digital visible image or the monitor signal; and
determine a concentration of the airborne particles based on the determined opacity.

15. The apparatus of claim 14 wherein the processing system is operable to cause the operational parameter change based on the determined concentration.

16. The apparatus of claim 1 wherein:
the emissions comprise a gas released from the wellsite or the wellsite equipment;
the UAV comprises a gas sensor operable to generate a gas signal indicative of the gas; and
the monitor signal is, comprises, or is generated based at least partially on the gas signal.

17. The apparatus of claim 16 wherein:
the processing system or the UAV is operable to determine a concentration of the gas based on the gas signal or the monitor signal; and
the processing system is operable to cause the operational parameter change based on the determined concentration.

18. The apparatus of claim 16 wherein the gas is or comprises one or more of methane, carbon monoxide, carbon dioxide, hydrogen sulfide, nitrous oxide, and/or volatile organic compounds (VOC).

19. The apparatus of claim 1 wherein the wellsite is a hydraulic fracturing wellsite.

20. The apparatus of claim 1 wherein the processing system is operable to operate the wellsite equipment in real-time as the UAV is flying through the airspace.

21. The apparatus of claim 1 wherein:
the UAV comprises a transmitter operable to wirelessly transmit the monitor signal; and
the apparatus further comprises a wireless receiver located at the wellsite and operable to receive the monitor signal.

22. The apparatus of claim 1 wherein the processing system is wirelessly communicatively connected with the wellsite equipment.

23. The apparatus of claim 1 wherein the processing system is at least partially located at the wellsite, and wherein the processing system is communicatively connected with the wellsite equipment.

24. A method comprising:
flying an unmanned aerial vehicle (UAV) through an airspace above a wellsite;
operating a plurality of wellsite equipment components at the wellsite;
operating a sensor carried by the UAV to generate a wireless monitor signal related to emissions in the airspace; and
adjusting the operation of one or more of the wellsite equipment components based on information conveyed in the monitor signal.

25. The method of claim 24 wherein adjusting the operation of the one or more wellsite equipment components is performed while flying the UAV and operating the sensor in the airspace.

26. The method of claim 24 wherein the one or more wellsite equipment components comprise one or more of a sand delivery system, a guar delivery system, a fiber delivery system, a chemical additive delivery system, and/or a cement delivery system.

27. The method of claim 24 wherein adjusting the operation of the one or more wellsite equipment components comprises operating a processing system comprising a processor and a memory including computer program code, and wherein operating the processing system comprises:
receiving the monitor signal;
generating an output signal based on the information conveyed in the monitor signal; and
communicating the output signal to the one or more wellsite equipment components to cause the operational adjustment.

28. The method of claim 27 wherein generating the output signal based on the information conveyed in the monitor signal comprises:
determining a concentration of the emissions in the airspace based on the information conveyed in the monitor signal; and
generating the output signal based on the determined concentration.

29. The method of claim 28 wherein the operational adjustment comprises an adjustment of a rate of operation of the one or more wellsite equipment components in response to the determined concentration exceeding a predetermined threshold.

30. The method of claim 28 wherein the operational adjustment comprises a cessation of operation of the one or more wellsite equipment components in response to the determined concentration exceeding a predetermined threshold.

31. The method of claim 28 wherein the operational adjustment comprises an initiation of vacuum equipment at the wellsite in response to the determined concentration exceeding a predetermined threshold.

32. The method of claim 28 wherein operating the processing system further comprises generating an alert in response to the determined concentration exceeding a predetermined threshold.

33. The method of claim 24 wherein the emissions comprise airborne particles of a compositional component of a fluid for treatment of a subterranean formation, and wherein the monitor signal includes information related to opacity of the airborne particles.

34. The method of claim 33 wherein the airborne particles comprise one or more of cement dust, guar dust, fiber dust, chemical additive dust, silica dust, and/or sand dust.

35. The method of claim 33 wherein:
the emissions comprise airborne particles of a compositional component of a fluid for treatment of a subterranean formation;
operating the sensor comprises capturing a digital visible image of the airborne particles; and
the monitor signal includes information related to the captured digital visible image.

36. The method 35 wherein operating the sensor comprises:
determining opacity of the airborne particles based on the information related to the captured digital visible image; and
determining a concentration of the airborne particles based on the determined opacity.

37. The method of claim 24 wherein the emissions comprise a gas released from the wellsite or a gas-releasing one of the wellsite equipment components, and wherein the monitor signal includes information related to the gas.

38. The method of claim 37 wherein the gas is or comprises one or more of methane, carbon monoxide, carbon dioxide, hydrogen sulfide, nitrous oxide, and/or volatile organic compounds (VOC).

39. The method of claim 37 wherein adjusting the operation of the one or more wellsite equipment components comprises adjusting the operation of the gas-releasing one of the wellsite equipment components.

40. The method of claim 24 wherein the wellsite is a hydraulic fracturing wellsite.

41. The method of claim 24 further comprising processing the monitor signal by a processing system.

42. The method of claim 41 wherein the UAV carries at least a portion of the processing system.

43. The method of claim 41 wherein the processing system causes the operational adjustment of the one or more wellsite equipment components via wired communication with the one or more wellsite equipment components.

44. The method of claim 41 wherein the processing system causes the operational adjustment of the one or more wellsite equipment components via wireless communication with the one or more wellsite equipment components.

* * * * *